E. L. MOESCHLER.
MACHINE FOR GAGING THE SIZE OF LOAVES OF BREAD.
No. 62,354. Patented Feb. 26, 1867.
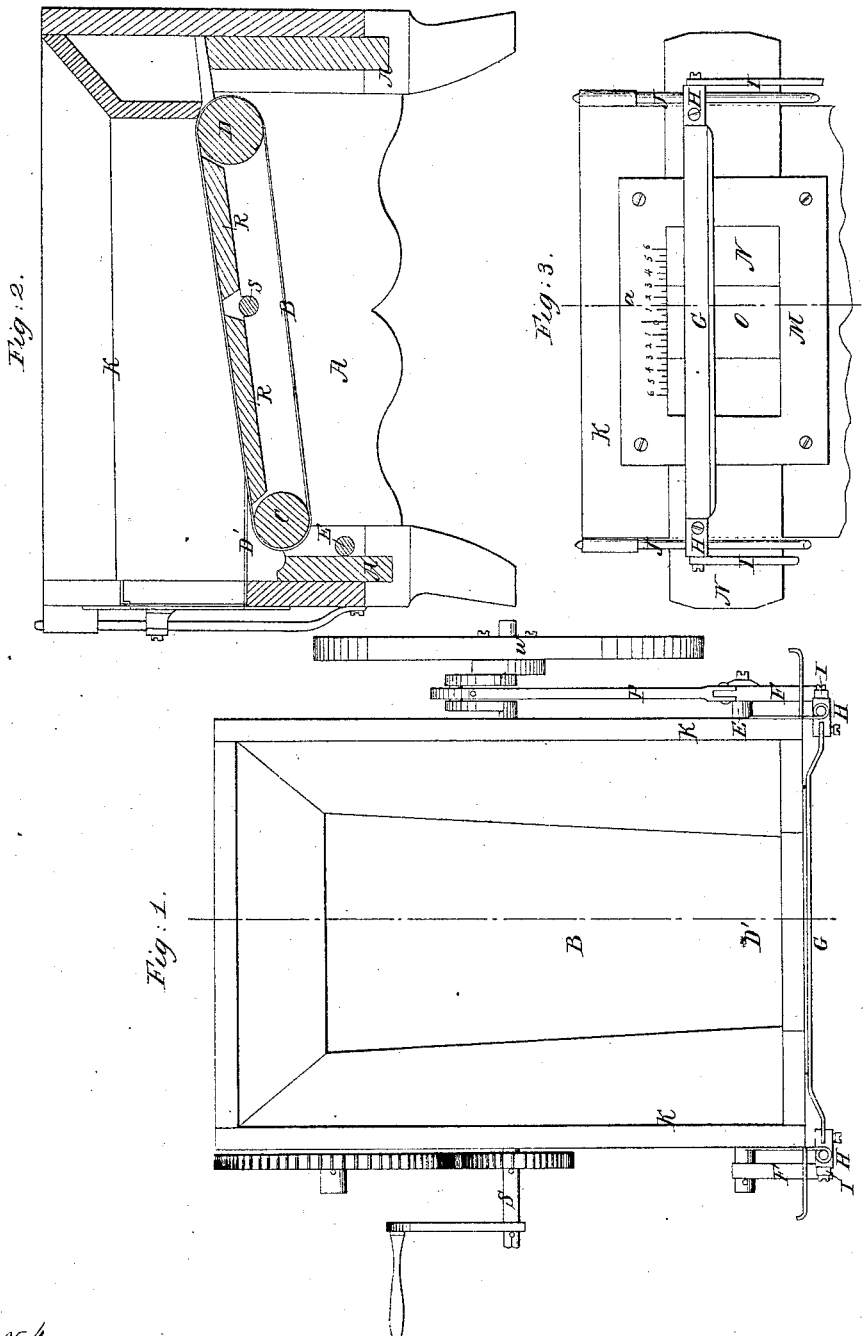

United States Patent Office.

E. L. MOESCHLER, OF ROCHESTER, NEW YORK.

Letters Patent No. 62,354, dated February 26, 1867.

IMPROVED MACHINE FOR GAUGING THE SIZE OF LOAVES OF BREAD.

*The Schedule referred to in these Letters Patent and making part of the same.*

TO ALL WHOM IT MAY CONCERN:

Be it known that I, E. L. MOESCHLER, of Rochester, in the county of Monroe, and State of New York, late of Kayna, in the Province of Saxony, in the Kingdom of Prussia, have invented a new and useful machine for "Gauging the Size of Bread Loaves," or other pastry which is to be sold by the loaf or cake; and I do hereby declare that the following is a full, clear, and exact description thereof, reference being had to the accompanying drawings, making part of this specification, in which—

Figure 1 is a plan of my invention.

Figure 2 is a vertical section taken in the plane of the red line in figs. 1 and 3.

Figure 3 is a front elevation of the upper portion of the machine, showing the throat, gauge plates, and the cutter.

Similar letters of reference indicate corresponding parts in the several figures.

Much inconvenience has been experienced in getting the proper quantity of dough in bread loaves of any particular size, in order to afford them the proper weight. This sizing or gauging has been done heretofore by actually weighing each loaf, and adding to or taking from the quantity originally placed upon the scales, as might be found necessary, it seldom happening that the exact quantity be placed on the scales in the first instance.

The object of this invention is to cut the dough by machinery of an entirely uniform size, and of any size to afford the desired weight, and its nature consists mainly in providing a revolving belt at the bottom of a trough or hopper, at one end of which is arranged a variable throat through which the dough is pressed by the belt, and across which throat a knife is reciprocated at regular intervals, to cut the dough into loaves.

To enable others to make and use my invention, I will describe its construction and operation.

The bench or frame A may be made of wood or iron, and one end somewhat elevated. In this frame is hung the main driving-shaft S, to which may be hung an ordinary fly-wheel, $w$. The roller D is geared to the shaft S, and is connected to the roller C by the endless belt B. This belt is supported on the upper side between the rollers by the rest R. The rock-shaft E is provided at each end with a horizontal arm, F, that works the cutter or knife G, by means of the vertical connecting-rods I. The heads H, to which the rods are connected, are supported by the hangers or guide-rods J. They are fixed to the hopper frame or case K. The rock-shaft is connected to the driving-shaft S by the pitman P, fig. 1. The hopper may be somewhat contracted at the front end, where it is provided with a suitable throat plate, M, fig. 3. The opening or space O of the throat may be enlarged or reduced by means of the slides N. The throat-plate may be graduated, as seen at $a$, if desired, by ascertaining the amount of opening requisite for the relative travel of the belt, and the reciprocations of the knife. The driving-roller D may be fluted, if necessary, to prevent the belt from slipping. The belt may be more or less inclined as may be deemed necessary. After the dough has been properly mixed and kneaded, it is placed in the hopper upon the belt in sufficient quantity to fill the opening left in the throat, as it is carried forward by the belt, and thereby form the loaves of an entirely uniform size, and very rapidly. The divider D' separates the dough from the belt. This, however, may be dispensed with by so arranging the parts as to have the knife strike upon the belt to divide the dough.

What I claim as my invention, and desire to secure by Letters Patent, is—

The employment of one or more gauging or graduating slides N, either with or without a graduated throat piece or plate, in combination with a revolving belt and reciprocating knife, for the purpose set forth.

E. L. MOESCHLER.

Witnesses:
WM. S. LOUGHBOROUGH,
P. T. TURNER.